United States Patent [19]

Lencki et al.

[11] Patent Number: 4,822,534

[45] Date of Patent: Apr. 18, 1989

[54] METHOD OF PRODUCING MICROSPHERES

[76] Inventors: Robert W. J. Lencki, 1650 Lincoln Ave., Apt. 1101, Montreal, Quebec, Canada, H3H 1H1; Ronald J. Neufeld, 110 Westbank Ave., Pointe Claire, Quebec, Canada, H9R 2X6; Trevor Spinney, 3739 St. Dominique, Montreal, Quebec, Canada, H2X 2Y6

[21] Appl. No.: 24,554

[22] Filed: Mar. 11, 1987

[51] Int. Cl.$^4$ .............................................. B01J 13/02
[52] U.S. Cl. .................... 264/4.3; 252/315.3; 264/4.1; 424/455; 424/461; 426/98; 426/103; 435/178
[58] Field of Search ............ 252/315.3; 264/4.1, 264/4.3; 424/455, 461; 435/178

[56] References Cited

U.S. PATENT DOCUMENTS

| | | | |
|---|---|---|---|
| 3,854,981 | 12/1974 | Schon et al. | 427/212 |
| 3,906,116 | 9/1975 | Quesnel et al. | 426/98 X |
| 4,148,689 | 4/1979 | Hino et al. | 435/177 X |
| 4,391,909 | 7/1983 | Lim | 435/178 |
| 4,711,782 | 12/1987 | Okada et al. | 424/455 |
| 4,720,460 | 1/1988 | Barach et al. | 435/172.1 X |

FOREIGN PATENT DOCUMENTS

| | | | |
|---|---|---|---|
| 0152898 | 8/1985 | European Pat. Off. | 428/321.5 |
| 1163023 | 9/1969 | United Kingdom | 264/4.1 |

*Primary Examiner*—Richard D. Lovering
*Attorney, Agent, or Firm*—Robert J. Koch

[57] ABSTRACT

Providing a water slurry containing an immobilizing agent and an insoluble substance, such as calcium citrate, effective to cause gelation of the immobilizing agent. The water slurry is then contacted with a hydrophobic liquid, such as a vegetable oil under conditions leading to the formation of a dispersion of droplets of the water slurry in the hydrophobic liquid. The droplets gel to form microspheres by adding an oil-soluble organic acid, such as acetic acid to the dispersion containing the droplets. Possibility of producing microspheres which are very small and are constituted of nearly perfect spheres. If desired the method can be adapted to produce microspheres containing immobilized material.

28 Claims, No Drawings

METHOD OF PRODUCING MICROSPHERES

BACKGROUND OF THE INVENTION (a) Field of the Invention

This invention relates to microspheres, and to the method of producing the same. More particularly the present invention is concerned with the production of an immobilizing material, such as calcium alginate beads.

(b) Description of Prior art

The immobilization or isolation of components in small spherical particles has proven to be of great utility in a wide variety of industrial applications. Ever since the development by National Cash Register Corp. of microencapsulated inks for carbonless copies in the 1950's [1], many techniques have been developed for immobilizing other hydrophobic solvents, high molecular weight water soluble molecules (proteins, polymers, hemoglobin) as well as living cells [2].

Many early immobilization methods involved the use of organic solvents or other chemicals that were incompatible with many potential biological encapsulants [3]. The use of various gel forming proteins (collagen and gelatin) and polysaccharides (agar, calcium alginate, and carrageenan) introduced a milder, biocompatible immobilization system [4]. This method involved heating the gel until liquefaction (40°-60° C.) occurred, adding the material to be immobilized, and cooling the solution until it solidified. However, this procedure has several drawbacks since the high temperatures used could prove to be incompatible with thermally labile material as well as the resulting gel must be cut into small pieces.

A more gentle and practical system has been developed that involves adding an ionic polysaccharide solution containing the material to be immobilized dropwise through a syringe needle into a solution of a divalent cation (typically $CaCl_2$), the ion crosslinking the charged species on the polysaccharide and thus forming an insoluble gel bead [5]. This system typically uses alginate as the ionic polysaccharide and has been popular for immobilizing many diverse materials such as plant [6] and mammalian [7] cells, yeast [8], bacteria [9], insulin [10], toners [11], magnetite [12] as well as producing food products like artificial caviar [13].

This method will produce microspheres of uniform size. However, it has three drawbacks; the first being that reduction in microsphere diameter is limited by the syringe needle diameter as well as the viscosity of the solution, with microspheres less than 1.0 mm being difficult to produce. Smaller microspheres have the advantage that small molecules can diffuse in or out of the beads at higher rates (less mass transfer limitations). Their use would therefore result in more rapid reaction rates and microsphere rupture resulting from possible gas production (such as $CO_2$ in fermentation) would be eliminated. Also, if the microspheres were used for controlled release of a particular substance, this release would occur more rapidly.

The second drawback of the drop technique is that the microspheres tend to be teardrop-shaped due to drag forces on the alginate droplet when it solidifies following impact with the solidifying solution ($CaCl_2$).

Finally, the third limitation of this drop technique is that it is not suitable for industrial scale-up. To manufacture microspheres on a large scale, a large number of needles would have to be operated concurrently.

Several techniques to alleviate the first problem have been developed. Air jets impinging on the needle, electrostatic systems, and rotating or vibrating needles have been examined and do produce smaller microspheres (down to <0.5 mm). Atomizing spray techniques have also been developed. This latter technique does produce smaller microspheres at higher rates but shearing effects in such a system could prove to be harmful to many biological species.

Producing microspheres via emulsion techniques have been utilized in other production methods but have only been used on a few occasions with ionic polysaccharides. One technique involves a hot carrageenan/oil emulsion that is dropped into cold water [14]. Another method involves cooling this emulsion in an ice bath [15]. An oil-in-aqueous alginic acid emulsion can also be added dropwise to a $CaCl_2$ solution to encapsulate oil droplets in alginate [16]. The former techniques have the heat requirement disadvantage whereas the latter still requires a drop technique.

The difficulty of using emulsion techniques with ionic polysaccharide/$CaCl_2$ is that both reactants are insoluble in the oil phase. An emulsion of a polysaccharide aqueous solution in oil can be added to a $CaCl_2$ solution [15]. This technique will produce capsules, however, diameters cannot be controlled and the capsules tend to coagulate into large masses before hardening properly.

SUMMARY OF INVENTION

It is an object of the present invention to provide a method whereby droplets formed, harden instantly into perfectly spherical microspheres.

It is another object of the present invention to provide microspheres which are of great utility in biotechnological and biomedical applications such as immobilized enzymes or cells.

It is another object of the present invention to provide a method which uses a dispersion to produce spherical droplets and an oil soluble acid, such as acetic acid to harden the droplets into solid micro- spheres.

It is another object of the present invention to provide a method for the production of microspheres, which method comprises providing a water slurry containing an immobilizing agent and an insoluble substance effective to cause gelation of the immobilizing agent, followed by contacting the water slurry with a hydrophobic liquid under conditions leading to the formation of droplets of the water slurry in the hydrophobic liquid, and finally adding an oil-soluble organic acid to the mixture obtained in the previous step to solubilize the insoluble substance in the slurry and convert the droplets into solid microspheres.

If no other ingredients are added to the water slurry, the microspheres produced by the method according to the invention will mainly comprise the immobilizing agent.

If on the other hand it is desired to obtain microspheres containing materials to be immobilized in the immobilizing agent, it is merely sufficient to add the materials to be immobilized to the water slurry before adding the hydrophobic liquid.

However, if an emulsion is first produced by adding oil to the water slurry, the method according to the invention will produce microspheres containing droplets of oil encapsulated in the immobilizing agent.

According to another embodiment of the invention, it is possible to obtain microspheres containing an oil as well as other materials to be immobilized in the immobilizing agent merely by adding these materials to the water slurry, and mixing to form an emulsion.

The oil-soluble organic acid is preferably added into the oil which has the effect of immediately partitioning into the aqueous phase, thus instantaneously lowering the pH of the droplet, solubilizing the crystalline substance used to cause gelation of the immobilizing agent and producing solid microspheres of the immobilizing agent.

Although the nature of the immobilizing agent is not critical and the choice of the material used is left to one skilled in the art, it usually comprises a polysaccharide, such as sodium alginate, potassium alginate, carrageenen, tragacanth gum, sodium pectate and the like. Generally speaking, the immobilizing agent may comprise any polyanionic polymer. The preferred immobilizing agent is sodium alginate.

The method according to the invention may preferably be carried out at a preestablished pH, in which case a pH adjusting compound, such as a buffering salt, may be added to the water slurry. Examples of buffering salt include sodium citrate, disodium phosphate, potassium citrate, and the like.

When microspheres have been obtained by adding an oil-soluble acid to the mixture containing droplets of the water slurry in the hydrophobic liquid, solid beads can be maintained by storing the microspheres in a solution containing a storage compound well known to those skilled in the art. Such storage compound is normally a multivalent salt, such as calcium chloride, barium chloride, magnesium chloride and the like.

The oil-soluble organic acid may vary to a large extent, but is normally selected among the group consisting of acetic acid, citric acid and lactic acid, acetic acid being preferred.

Although any hydrophobic liquid may be used in the method according to the invention, the preferred and most convenient liquid is a vegetable oil, such as corn oil, peanut oil, palm oil or the like.

The formation of droplets of the water slurry in the hydrophobic liquid is carried out by any means known to those skilled in the art.

Normally, the oil-soluble organic acid should be added in an amount merely sufficient to lower the pH of the water slurry to a minimum value of about 4.5. This is particularly the case when acetic acid is used.

In accordance with a preferred embodiment of the invention, the method is carried out by controlling the conditions under which the water slurry is contacted with the hydrophobic liquid to give beads whose bead size diameter ranges from 20–800 micrometers, preferably 50–500 micrometers.

In accordance with another preferred embodiment of the invention, the conversion of the droplets into microspheres is carried out by stirring in a reactor under shear conditions sufficiently low to protect fragile materials to be immobilized.

Preferably, the immobilizing agent consists of sodium alginate, the gelation causing substance consists of calcium citrate and the hydrophobic liquid consists of a vegetable oil, such as corn oil.

The preferred species to be immobilized which are introduced into the water slurry include high molecular weight substances, living cells, such as yeast, inorganic materials, such as magnetite, and the like.

The ratio between the water slurry and the hydrophobic liquid usually varies between 1:2 to 1:5.

Normally, the acid used to convert the droplets into solid microspheres is added to the water in oil dispersion, as a vegetable oil solution, preferably containing 0.2 to about 5 volume percent glacial acetic acid.

Preferably, the method comprises mixing the glacial acetic acid containing vegetable oil with the dispersion obtained by contacting the water slurry with a hydrophobic liquid for about 1 to 5 minutes, allowing the beads to settle, decanting oil phase and adding the microspheres to a calcium chloride solution to store the microspheres.

Since dispersions can be produced industrially on very large equipment, the scale-up potential of the method according to the invention is almost unlimited. Also, because non toxic solvents are used, biological or food applications can be utilized.

The method according to the invention can be used to produce an oil-in-aqueous-polysaccharide solution initially. This emulsion can then be dispersed in the oil phase and subsequently hardened via the addition of acid. This will produce a polysaccharide microsphere containing oil droplets. One use for this type of technology is in the food industry to encapsulate food flavors and aromas.

The invention will now be illustrated by means of the following examples which are in no way intended to limit its scope.

EXAMPLE 1

Method for Producing Immobilizing Media

The following methodology will produce 200 ml of media.

(1) mix at high speed for 2 minutes in a Waring TM blender or other high-shear mixing device, 200 ml of distilled water, 0–2 grams of sodium citrate and 4 grams of sodium alginate to yield a 2% solution of alginate.

(2) add 5–15 ml of a 10% slurry of calcium citrate and mix at high speed for a further 2 minutes.

EXAMPLE 2

Oil-in-Alginate Emulsion Formation

The following technique is used to emulsify oil or oil-soluble compounds in immobilizing media.

The oil encapsulant is mixed with the media produced in EXAMPLE 1 in proportions ranging from 1:2 to 1:5 and mixed at high speed in a Waring TM blender or other high-shear mixing device for 2 minutes (surfactants can be added if necessary to stabilize the emulsion produced).

EXAMPLE 3

Production of Alginate-in-Oil Dispersion and Microspheres

The apparatus used to produce an appropriate dispersion can be any batch or in-line mixing device. For shear sensitive materials to be immobilized, a batch reactor with a low shear impeller (e.g. anchor or screen type) should be used. The following method is appropriate for a 200 ml batch mixer with four standard baffles and an impeller consisting of four flat blades made of wire mesh.

(1) 20–45 ml of the solution prepared via the method outlined in Example 1 is mixed with the material to be immobilized in a ratio of up to 1:1. 20–45 ml of the emulsion made via the method outlined in EXAMPLE 2 can also be used with or without another material to be immobilized.

(2) 125 ml of vegetable oil is placed in the reactor and the impeller speed set at 50–500 rpm.

(3) The solution prepared in step 1 is added to the reactor while stirring is maintained. Stirring is continued for 1–15 minutes to allow the dispersion to properly form.

(4) While still stirring, 30 ml of vegetable oil containing 0.1–1.0 ml glacial acetic acid is then added to the reactor.

(5) After 2 minutes, the impeller was shut off and the solid microspheres were allowed to settle for 5 minutes.

(6) Excess corn oil was first removed and then the remaining microsphere/oil mixture was decanted into 100 ml of a storage solution of 0.05 M calcium chloride in distilled water.

(7) The remaining oil was removed from the microspheres by gentle orbital mixing and then skimmed from the top of the aqueous solution.

Approximately 40 ml of microspheres were produced (0.50 packing porosity) with sizes ranging from 80 to 300 micrometers and a mean diameter of 150 micrometers.

Using the method outlined in Example 3, hydrophobic liquids, solids and high molecular weight molecules or biological cells have been immobilized in alginate microspheres.

EXAMPLE 4

Calcium Alginate Microspheres Containing Corn Oil

The corn oil in aqueous media emulsion was prepared as follows: 160 ml of the regular gelling media described in Example 1 and 40 ml of corn oil were mixed in a Waring TM blender at high speed for 5 minutes. Since the resulting emulsion behaved like an aqueous solution, it was then treated in the same manner as the regular gelling media described in paragraph two of Example 3. The microspheres resulting from the gelling procedure ranged in size from 200 to 500 micrometers and contained droplets of oil 1 to 10 micrometers in diameter.

Some species to be entrapped (e.g. biological cells or magnetite) are available only in aqueous solution. Therefore, the gelling media must be adjusted to compensate for the resulting diluting effect.

EXAMPLE 5

Calcium Alginate Microspheres Containing Plant Cells

A gelling media was prepared as follows: 200 ml of distilled water and 5.5 g of sodium alginate were mixed at high speed in a Waring TM blender for 2 minutes. The pH of the solution was then adjusted to 7.0 by adding approximately 0.25 g sodium citrate. A 12% calcium citrate suspension was then prepared by adding 1.2 g calcium citrate powder to 10 ml of distilled water. All of the 10 ml suspension solution was added to the previously described alginate solution and mixed in a Waring TM blender for a further 5 minutes. The resulting solution will be subsequently referred to as the concentrated gelling media.

20 ml of this concentrated gelling media was gently mixed with 5 ml of a 30 g/l solution of *Catharanthus roseus* cells. The resulting mixture was then treated in the same manner as the regular gelling media in paragraph two of Example 3. The only change in procedure was that the rotational speed of the mixer impeller was reduced to 100 rpm (to reduce the maximum shear stress of the mixer). The resulting immobilized cell microspheres were 400 to 800 micrometers in diameter.

EXAMPLE 6

Calcium Alginate Beads Containing Magnetite

A 5% magnetite suspension was prepared via the method used by Hirchbein and Whiteside (*Appl. Biochem. Biotechnol.* 7, 157 (1982)). 5 ml of this suspension was then added to 20 ml of the concentrated gelling media described in Example 5. The resulting mixture was then treated in the same manner as the regular gelling media in paragraph two of Example 3. The resulting magnetic beads were 100 to 350 micrometers in diameter.

Any combination of solid, hydrophobic liquid and high molecular weight molecule or biological cell can be coentrapped by this procedure.

EXAMPLE 7

Calcium Alginate Beads Containing Corn Oil and Yeast

A concentrated gelling media was prepared via the method outlined in Example 5. 160 ml of the concentrated gelling media and 80 ml of corn oil were then mixed in a Waring TM blender at high speed for 5 minutes. 5 ml of a concentrated paste (200 g/l) of yeast cells (*Saccaromyces cerevisae*) was then added to 20 ml of this mixture and gently stirred with a glass rod for one minute until a homogeneous mixture was produced. The resulting mixture was then treated in the same manner as the regular gelling media in paragraph two of Example 3. The resulting beads were 400 to 800 micrometers in diameter.

The method according to the invention presents a new and innovative method of producing small ionic polysaccharide microspheres containing solids, an oil phase, or an aqueous phase containing high molecular weight compounds or living biological cells. This method is fast, easily scaled-up, and does not use potentially toxic materials. Such a method has great potential in biotechnology, biomedicine as well as in the food industry.

REFERENCES (1) Kondo, Tamotsu; Microcapsules: Their preparation and Properties. *Surf. Colloid. Sci.* 10 1 (1978).

(2) Chang, T. M. S.; *Artificial Cells.*, Charles C. Thomas, Springfield, Ill., U.S.A., (1972).

(3) Chang., T. M. S., F. C. MacIntosh and S. G. Mason: *Can. J. Physiol. Pharmacol.* 44 115 (1966).

(4) Kennedy, J. F. and J. M. S. Cabral; *Immobilized Enzymes in Solid Phase Biochemistry* (ed. by W. H. Scouten) *Chemical Analysis* vol. 66, p. 253–392 (1983).

(5) Kiestan, M. and C. Bucke; *The Immobilization of Microbial Cells, Subcellular Organelles and Enzymes in Calcium Alginate Gels.*, Biotechnol. Bioeng. 19 387–397 (1977).

(6) Redenbaugh, K. et al.; *Somatic Seeds: Encapsulation of Asexual Plant Embryos.* Bio/Technology 4 797–801 (1986).

(7) Lim, F. and A. M. Sun; *Microencapsulated Islets as Biocartificial Endocrine Pancreas.* Science 210 908–910 (1980).

(8) Shiotani, T. and T. Yamane; *A Horizontal Packed-Bed Bioreactor to Reduce Carbon Dioxide Gas Holdup in the Continuous Production of Ethanol in*

*Immobilized Yeast Cells. Eur. J. Appl. Microbiol. Biotechnol.* 13 (2) 96-101 (1981).

Provost, H. C. Divies and E. Rousseau; *Continuous Production with Lactobacillus Bulgaricus and Streptococcus Thermophilus Entraped in Calcium Alginate. Biotechnol. Lett.* 7(4) 247-52 (1985).

(10) Lim, F.; *Sustained Release Capsules.* U.S. patent application Ser. No. 485,471 Apr. 15, 1983.

(11) K. Canon; *Electrostatic Image Development Toners.* JPN Kokai Tokkyo Koho JP No. 59 170,853 [84 170,853] 27 Sept. 1984.

(12) Burns, M. A., G. I., Kvesitadze and D. J. Graves; *Dried Calcium Algin/Magnetite Spheres: A New Support for Chromatographic Separations and Enzyme Immobilization. Biotechnol. Bioeng.* 27 (2) 137-145 (1985).

(13) Q. P. Corp; *Production of Fish Egg-Like Spherical Food Material.* JPN Kokai Tokkyo Koho JP No. 60 83,570 [85 83570] 11 May 1985.

(14) van Velzen, A. G.; U.S. Pat. No. 3,838,007.

(15) Nilsson, K. et al.; *A General Method for the Immobilization of Cells with Preserved Viability. Eur. J. Appl. Microbiol. Biotechnol.* 17 319-326 (1983).

(16) Lim, F. and R. D. Moss; *Encapsulation of Oils and Oil-Soluble Materials.* U.S. patent application Ser. No. 205,340 10 Nov. 1980, now U.S. Pat. No. 4,389,419.

We claim:

1. Method for the production of microspheres which comprises
   a) providing a water slurry containing an immobilizing agent and a substance effective to cause gelation of said immobilizing agent,
   b) contacting said water slurry with a hydrophobic liquid under conditions leading to formation of droplets of said water slurry in said hydrophobic liquid, and
   c) adding an oil soluble organic acid to mixture obtained in step b to convert said droplets into solid microspheres.

2. Method according to claim 1, which comprises mixing an oil into said water slurry thereby obtaining microspheres containing oil droplets entrapped in said immobilizing agent.

3. Method according to claim 2, wherein said oil contains species to be immobilized and the microspheres contain said oil and said species in said immobilizing agent.

4. Method according to claim 1, which comprises introducing materials to be immobilized into said water slurry so as to obtain solid microspheres containing said materials and said immobilizing agent.

5. Method according to claim 1, wherein said immobilizing agent comprises a polysaccharide.

6. Method according to claim 5, wherein said polysaccharide is selected from the group consisting of sodium alginate, potassium alginate, carrageenan, tragacanth gum and sodium pectate.

7. Method according to claim 1, wherein said immobilizing agent comprises a polyanionic polymer.

8. Method according to claim 1, wherein said immobilizing agent comprises sodium alginate.

9. Method according to claim 1, which comprises adding a pH adjusting compound to said water slurry.

10. Method according to claim 9, wherein said pH adjusting compound is a buffering salt.

11. Method according to claim 9, wherein said pH adjusting compound is selected from the group consisting of sodium citrate, disodium phosphate and potassium citrate.

12. Method according to claim 11, which comprises storing microspheres obtained in step c in a microsphere storage solution to maintain solid microspheres.

13. Method according to claim 12, wherein said microsphere storage solution contains a multivalent salt, capable of maintaining solid microspheres.

14. Method according to claim 13, wherein said multivalent salt is selected from the group consisting of calcium chloride, barium chloride and magnesium chloride.

15. Method according to claim 1, wherein said oil soluble organic acid is selected from the group consisting of acetic acid, citric acid and lactic acid.

16. Method according to claim 15, wherein said acid is acetic acid.

17. Method according to claim 1, wherein said hydrophobic liquid is a vegetable oil.

18. Method according to claim 17, wherein said vegetable oil is corn oil.

19. Method according to claim 1, wherein the formation of droplets is carried out by dispersing said water slurry in a hydrophobic liquid.

20. Method according to claim 1, wherein said oil-soluble organic acid is used in an amount merely sufficient to lower the pH of the water slurry to a minimum value of 4.5.

21. Method according to claim 1, which comprises controlling conditions under which said water slurry is contacted with said hydrophobic liquid to give droplets whose diameter ranges from 50-500 micrometers.

22. Method according to claim 1, wherein step c is carried out by stirring in a reactor under shear conditions sufficiently low to protect fragile materials to be immobilized.

23. Method according to claim 1, wherein the immobilizing agent consists of sodium alginate, the gelation causing substance consists of calcium citrate and the hydrophobic liquid consists of a vegetable oil.

24. Method according to claim 23, which comprises introducing into said water slurry, materials to be immobilized selected from the group consisting of high molecular weight substances, cells and inorganic materials.

25. Method according to claim 24, wherein said cells comprise microorganisms, plant and animal cells.

26. Method according to claim 24, wherein step c includes adding a vegetable oil containing about 0.2 to about 5 volume percent glacial acetic acid.

27. Method according to claim 24, which comprises mixing the glacial acetic acid containing vegetable oil with the mixture obtained in step b for about 1 to 5 minutes, allowing the solid microspheres to settle, decanting oil phase and adding the microspheres to a calcium chloride solution to store said microspheres.

28. Method according to claim 1, wherein the ratio between the water dispersion and the hydrophobic liquid ranges between 1:2 to 1:5.

* * * * *